United States Patent [19]
Kagan et al.

[11] Patent Number: 5,237,681
[45] Date of Patent: Aug. 17, 1993

[54] RELATIONAL DATA BASE MEMORY UTILIZATION ANALYZER

[75] Inventors: Jeremy S. Kagan, Brooklyn, N.Y.; John N. Lutin, Manalapan, N.J.; Leo S. Sanders, Flushing, N.Y.

[73] Assignee: Bell Communications Research, Inc., Livingston, N.J.

[21] Appl. No.: 705,187

[22] Filed: May 24, 1991

[51] Int. Cl.$^5$ .............................................. G06F 11/34
[52] U.S. Cl. .............................. 395/600; 364/DIG. 1; 364/222.81; 364/264; 364/264.4; 364/265.3; 364/292.2; 364/283.4; 395/575
[58] Field of Search .................... 364/DIG. 1, DIG.2; 395/575, 600, 650, 700; 371/19, 21.1.21.6

[56] References Cited

U.S. PATENT DOCUMENTS

| | | | |
|---|---|---|---|
| 4,849,878 | 7/1989 | Roy | 395/600 |
| 4,888,681 | 12/1989 | Barnes et al. | 395/600 |
| 4,893,232 | 1/1990 | Shimaoka et al. | 395/600 |
| 5,093,779 | 3/1992 | Sakurai | 395/600 |

OTHER PUBLICATIONS

"The Dictionary of Computers, Information Processing, and Telecommunications," 2nd edition, 1987, John Wiley & Sons, p. 527.

"File Organization for Data Base Design," Gio Wiederhold, 1987, Mcgraw Hill pp. 63, 327–349.

"A Guide to DB2," C. J. Date, 1984, Addison-Wesley pp. 7–10.

*Primary Examiner*—Thomas C. Lee
*Assistant Examiner*—John C. Loomis
*Attorney, Agent, or Firm*—Leonard Charles Suchyta; Loria B. Yeadon

[57] ABSTRACT

Methods and apparatus are set forth for identifying the actual population of data within computer memory utilized to support a relational data base, where memory is defined herein as being "populated" if it is both allocated and actually filled with data. By identifying data population (thereby identifying unpopulated areas of memory versus simply making a determination of memory allocation without regard to how it is being used), utilities can be designed to recover memory resources, data base management techniques can be revised to more conservatively allocate memory, etc. Accordingly, memory resources can be more efficiently used and in certain instances the cost of adding memory to enhance a system can be delayed or eliminated.

27 Claims, 8 Drawing Sheets

RELATIONAL DATA BASE MEMORY UTILIZATION ANALYZER

BACKGROUND OF THE INVENTION

1. Field of the Invention

The invention relates generally to methods and apparatus for determining memory utilization in digital computer systems. More particularly, the invention relates to methods and apparatus for identifying the actual population of data within computer memory utilized to support a relational data base, where memory is defined herein as being "populated" if it is both allocated and (thereby identifying unpopulated areas of memory simply making a determination of memory allocation without regard to how it is being used), utilities can be designed to recover memory resources, data base management techniques can be revised to more conservatively allocate memory, etc. Accordingly, memory resources can be more efficiently used and in certain instances the cost of adding memory to enhance a system can be delayed or eliminated.

2. Description of the Related Art

Computer data bases can be classified into three main categories: Hierarchical, Network, and Relational. This invention concerns itself with methods and apparatus for analyzing relational data bases which store data in independent tables based on various mathematical algorithms.

"The Dictionary of Computers, Information Processing, and Telecommunications" (second edition, 1987, published by John Wiley and Sons) defines a relational data base as "A data base in which relationships between data items are explicitly specified as equally accessible attributes". An alternate definition, set forth in "A Guide to DB2", (by C. J. Date, published in 1984 by Addison-Wesley) describes a relational data base as a data base in which "The data is perceived by the user as tables (and nothing but tables)".

Accordingly, a relational data base may simply be thought of as a collection of relations where each relation is a table.

Relational data bases accommodate systems that store large amounts of data, providing rapid access for data retrieval, convenient updating, and economic storage. They can represent real world information structures, be reliable, afford privacy, and maintain integrity.

Having defined a relation as the data structure that corresponds to a table, further definitions may now be made of terms used herein to describe the invention.

The term "data page" (or "page"), as used herein refers to a fixed-length area of contiguous blocks of memory used to store a relation. Relations that occupy more space than available on one data page may have additional pages assigned as required.

Each data table, as indicated hereinabove, is called a relation, while each row (record) of a relation will be referred to hereinafter as a "tuple". The entries in a row (the columns) are defined herein as "attributes". The range of possible data that may populate an attribute is defined as the attribute's "domain". The attribute domain serves to define the valid entries that may be made for each attribute within the tuple, within the relation.

As an example, if a relational data base were to be constructed to allow description of food location within super markets, then each aisle might be considered a relation and every packed shelf would be a tuple within that relation. Each shelf position would have a domain indicating that only vegetables go here, and only fruits there. A specific can of 10 ounce sliced XYZ brand pineapple located on a particular shelf would be an attribute with which the shelf tuple has been populated.

To provide access to specific tuples, one or more attributes are designated as the "key" for the relation. This means that not more than one tuple with the same key exists in the relation. When specific tuples are to be accessed, the appropriate key must be given which will identify a unique tuple in the relation. A key may consist of more than one attribute and in this case, all attributes of the key must be provided to access this tuple.

Relational data bases use multiple data access and storage methods such as indexing, linear-sequential, and hashing to name a few. All of the methods require mathematical manipulation of the key. The particular type of data access and storage methods employed with respect to a given relation will be shown hereinafter to be a useful input, according to a preferred embodiment of the invention, in determining memory population. For the sake of completeness, various data access and storage methods, although well known to those skilled in the art, will be described hereinafter in the Detailed Description of the invention.

Finally, with respect to a relational data base, it should be noted that data page designs can be categorized into two types. First, all data pages can have the same size (for example, 32 contiguous blocks, each providing for the storage of 256 bytes of data), and as a particular relation needs more memory, a data base manager system allocates it another page.

Alternatively, the data base can have different classes of data page sizes that depend on the expected sizes of relations. In this type of relational data base, each relation has a fixed data page size that is independent of other relation's data page sizes. Within a relation, however, each data page has a fixed uniform size. Data pages are then allocated in multiples of the basic data block. For example, if the basic block is 256 bytes, data pages can be one block (256 bytes), 2 blocks (512 bytes), four blocks (1024 bytes), thirty-two blocks (8192 bytes), etc.

As indicated hereinbefore, the relational data base structure, outlined hereinabove for background purposes, is known to enable a computer system to store and access data base data relatively quickly. This is especially useful for computers that are transaction oriented, such as computers employed in modern day telephone switching systems.

Having described a relational data base and the terminology associated therewith, examples of known methods, models, etc., for monitoring memory resources, particularly in a relational data base, will now be set forth.

There exist, in computer systems associated with telephone switching systems, many well known methods and apparatus for monitoring memory resources. For example, in the commercially available 5ESS ("5ESS" is a registered trademark of AT&T) switching system, tools exist to report, on demand, allocated system data memory, data memory used by a particular processor, the system memory available (which is the total system memory less allocated memory), etc. However, such tools do not provide information on individual data structures within the data base. Accordingly, no indication is provided regarding unused memory space within the reportedly "used" section of the data base.

Again in the context of the 5ESS switch, a tool commonly referred to as an "Office Data base Editor", provides reports, on demand, of a data structure's design specifications. It can also count the number of individual items of information (previously referred to herein as "tuples") stored in a data structure. This tool is used to help a telephone company engineer locate a corrupted item of information in the data base and correct it manually. This tool is used on a structure by structure basis, and requires as input a structure's internal identification number. A single data base query can take over an hour depending on the telephone traffic the switching system processor is processing at the time of the data base query. Therefore, it is not a practical method for collecting data on the entire data base.

Still another known tool, a 5ESS "Access Editor", provides reports, on demand, of a data structure's design specifications. This includes a structure's internal identification number which is needed when accessing the Office Data base Editor, and the address of the data structure's master directory page. Like Office Data base Editor, this tool is used on a structure by structure basis. A single data base query can take longer than 10 minutes depending on the traffic load of the switching system at any time. The higher the telephone traffic the less resource the switching system processor can devote to a data base query. Again, the tool is not a practical method for collecting data on the entire data base.

Further yet, internal utility routines exist that can be used in the 5ESS switch for monitoring memory resources, such as programs which automate the manual terminal key strokes that are needed to query a data base using The Office Data base Editor and the Access Editor. However, internal system utilities are known to frequently cause data base reads to fail.

Outside the context of telephone switching systems per se, commercially available utilities, such as Norton Utilities, report, for example, the amount of memory used on a hard drive. Other memory management features are incorporated within such utilities, however, no methods or apparatus are provided which enable the user to determine the amount of unpopulated data in otherwise allocated memory.

Theoretical models for data base management are also known. For example, Gio Wiederhold in "File Organization for Data base Design", (Mcgraw-Hill, 1987), presents theoretical models for discussing data base population and presents mathematical models. However, he does not teach how to determine memory utilization in a real physical sense.

None of the above referenced tools, utilities, or theoretical models teach, claim or even suggest how to actually determine the amount of data populated within a "used" portion of memory. For example, a memory manager could have allocated a block of memory which to Norton Utilities would appear as "used", while only a portion of the block is actually populated with data.

In view of the known art, it would be desirable to provide methods and apparatus for very quickly and automatically analyzing a data base, in particular, a relational data base, structure by structure, to identify the amount of data actually populated (with at least tuple granularity) within the used portion of memory.

Furthermore, it would be desirable if such methods and apparatus could identify unused space, and compile statistics per structure and per data base.

Still further, it would be desirable if such methods and apparatus could operate with minimal user involvement, and not be dependent on or interfere with the operation of the computer system's transaction processing, be error free, etc.

SUMMARY OF THE INVENTION

It is an object of the invention to provide methods and apparatus for identifying the actual population of data within computer memory utilized to support a relational data base.

It is a further object of the invention to provide methods and apparatus for identifying unpopulated areas of memory (versus simply making a determination of memory allocation without regard to how it is being used), to support recovery of "unused" memory resources and the design of data base management techniques for allocating memory.

It is still a further object of the invention to provide methods and apparatus which provide an indication of the efficiency of data base management techniques and an indication to system design engineers and system managers of whether the memory resources in a given system are truly expended (typically requiring the purchase of additional memory capacity) or whether the cost of adding memory to enhance a system can be delayed or eliminated.

Further yet, it is an object of the invention to provide methods and apparatus that output data structure details for preselected data structures in a data base, particularly details related to allocated and populated memory.

In addition to all of the aforestated objects of the invention, it is yet another object of the invention to provide methods and apparatus which monitor memory usage, identify unused space, are able to complete the desired analysis of memory very quickly (in minutes rather than hours or days) with a minimum of data collection errors, and which allow off line analysis of a data base so as not to interfere with system transaction processing.

According to a preferred embodiment of the invention, a method (and corresponding apparatus) for identifying the actual population of data within computer system memory utilized to support a set of relational data bases, comprises the steps of (a) creating a list of files, wherein the set of files on said list constitute a preselected subset of said set of data bases and further wherein each file on said list contains a preselected set of relations to be analyzed; (b) creating a list of said preselected set of relations; (c) loading said list of files and said list of said preselected set of relations into a digital computer that is offline with respect to said computer system; (d) determining, via program means stored in said digital computer, the populated status of each tuple in each relation on said list of relations, said program means having access to said set of files; (e) compiling, via said program means, tuple population data; and (f) outputting, via said program means, said population data to thereby provide an indication of actual memory usage.

In accordance with a further embodiment of the invention, a method (and corresponding apparatus) for performing memory population analysis on a relational data base, wherein the contents of said data base include a first set of relations each having an associated status bit map for indicating tuple usage within a given relation, and a second set of relations each created utilizing a storage and access method that does not maintain an associated bit map, comprises the steps of (a) inputting, to a digital computer having access to the contents of said data base, a first set of signals specifying the relations to be analyzed; (b) inputting, to said digital computer, a second set of signals specifying the storage and access method associated with each relation in said set of relations; (c) determining, from said second set of signals, whether a given relation being analyzed has an associated bit map; (d) accessing the status bit map for each relation being analyzed and belonging to said first set of relations; (e) counting the number of unused tuples in each relation being analyzed and belonging to said first set of relations, directly from the status bit map associated with each such relation; (f) compiling memory status information based on the unused tuple count; and (g) outputting said memory status information.

Still further, whenever the aforementioned second set of relations is non-empty, the aforestated method contemplates counting tuples within each such relation by directly analyzing the contents of each tuple. By knowing tuple size and number of tuples in each relation in the second set of relations, and by convention defining an empty tuple as one containing a certain bit pattern (for example, all Fs (hex), data population in the second set of relations can be determined.

Further features of the invention include the ability to utilize methods, such as those set forth hereinabove, to complete the desired analysis of memory very quickly and with a minimum of data collection errors since copies of actual data base files (their binary content) may be directly analyzed.

These and other objects and features of the present invention will be understood by those of ordinary skill in the art after referring to the Detailed Description of a preferred embodiment and the appended drawing.

BRIEF DESCRIPTION OF THE DRAWING

FIG. 4 depicts the status bit map section of each data page accessible using a hash or linear access method.

DETAILED DESCRIPTION

Figure 1:
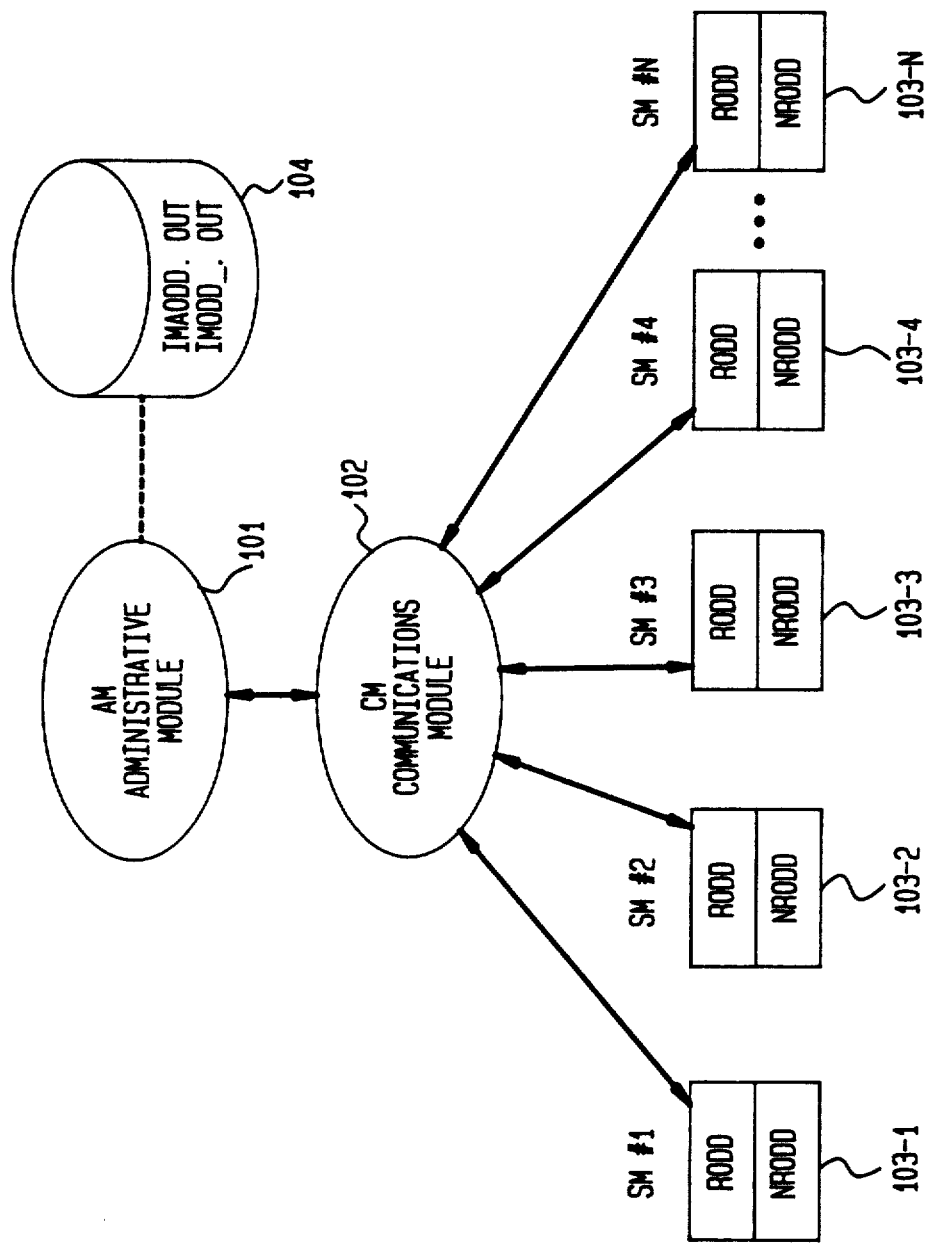
FIG. 1 depicts the main portions of a telephone switching system (e.g., the AT&T 5ESS), used hereinafter as a specific illustrative example of a computer based system that includes a set of relational data bases which can be analyzed, in accordance with the teaching of the invention, to determine actual data base population data.

A functional description of exemplary methods and apparatus for analyzing relational data bases in the manner contemplated by the invention will now be set forth in the context of the aforementioned 5ESS telephone switching system. Those skilled in the art will readily appreciate that the principles of the invention apply equally as well to relational data bases supported by computer systems generally, although the exemplary methods and apparatus set forth hereinafter find particular utility in a telephone switching system.

A preferred embodiment of a method for analyzing a set of relational data bases, in accordance with the principles of the invention, is a computer program suitable for execution on a digital computer that is offline from the computer system that processes transactions and updates the set of relational data bases in real time. More specifically, being offline from the computer system means that the digital computer operates outside of the normal processing of the computer system.

An alternate embodiment of the invention is a method of operating a digital computer into which copies of data base files being analyzed, together with a list of the particular relations to be analyzed, are input. The digital computer, operating under program control and in accordance with the teachings set forth herein, provides the desired data population information to the user.

A preferred embodiment of apparatus for analyzing a set of relational data bases, in accordance with the principles of the invention, is a digital computer operating under program control and offline from the aforementioned computer system.

A specific embodiment of the program portion of the relational data base memory analyzer contemplated by the invention, particularly in the telephone switching context in which the invention is being described, will be referred to hereinafter as the Central Office Memory Administration Program ("COMAP").

Before providing the details of the novel methods and apparatus contemplated by the invention, a brief overview of the exemplary 5ESS switch, in which the invention may be advantageously utilized, and a brief overview of various data storage and access methods that may be used to create relations within a relational data base, will be set forth.

A switching system like 5ESS provides customers intra-office access to other telephone lines within an exchange together with interoffice connections to other central offices. Modern switching systems are essentially large computers that process calls. A switch in its most basic form consists of a switching network to connect customers, a real time processor to control the network by acting on service requests, and memory to store programs and data for use by the processor.

The 5ESS has a distributed processor architecture consisting of one Administrative Module, one Communication Module and up to 192 switching modules (SMs). Although each SM within a switch shares common data, it performs call processing independent of any other SM. Accordingly, each SM could be thought of as a semi-independent switch.

The main parts of the 5ESS switch are depicted in FIG. 1 which shows the Administrative Module as unit 101, the Communications Module as unit 102 and n-SMs labeled 103-1 through 103-n.

The purpose of module 101 is to supervise the system, provide routing and call mapping functions, and to provide backup copies of all protected information kept on module 101 and the SMs. The purpose of Communications Module 102 is to provide and supervise time/space switching between module 101 and the SMs.

Different commercial versions of the 5ESS switch exist, each referred to hereinafter as a generic version of the switch. The memory capacity and addressing structure of each switching module (SM), for example, 103-1, may vary depending on the generic version of the switch.

Within the 5ESS switch a byte is defined as eight (8) binary bits of information numbered 7-0 which can either be set equal to 1 or be reset equal to 0. Each SM memory is partitioned in order to accommodate the following: (1) generic program memory (for storing the generic version of the program that runs the switch); (2) dynamic memory (used for call information collection, for example dialed digits); and (3) static memory (used for data base storage, for example, for storing information regarding features and/or services associated with customer lines).

Dynamic data may be thought of as information which is needed temporarily to process calls. Dynamic data is used and then discarded whereas static data remains stored in the data base. Static data generally consists of long term information such as customer phone numbers, the aforementioned features and services associated with a particular phone number, etc.

Static data in the relational data bases included in the 5ESS switch is the "work piece" for the invention, i.e., the specific memory component of the 5ESS memory structure being analyzed (to determine data population) in the exemplary context in which the invention may be used. The relational data base (in particular the input static portion of a 5ESS data base) may also be thought of as the physical item being transformed (by the illustrative embodiment of the invention) into data population information.

Figure 2:
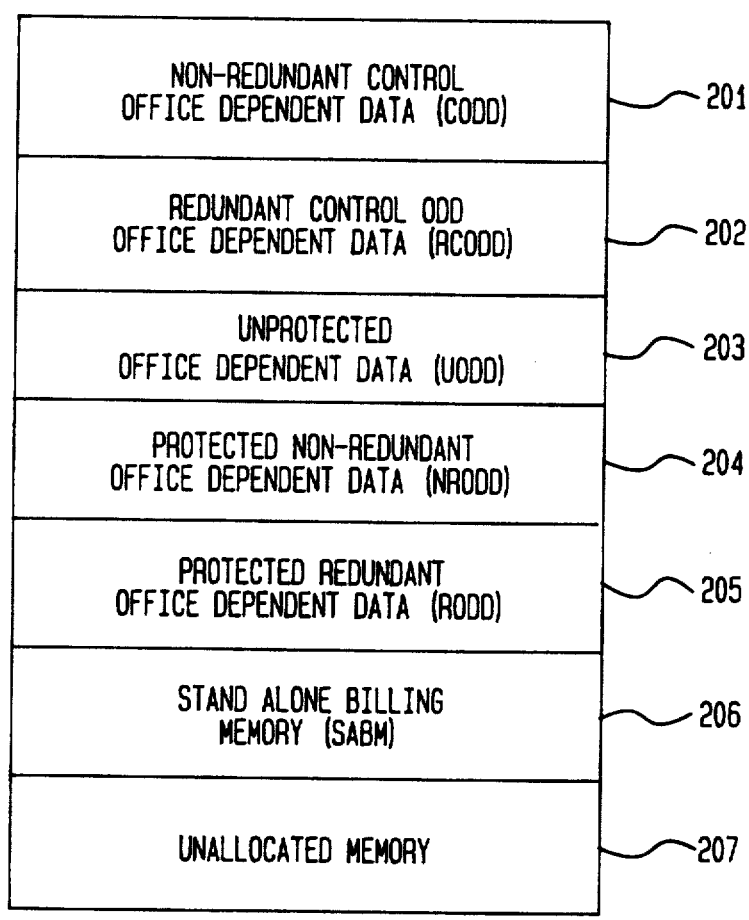
FIG. 2 depicts the divisions of switch module memory in the 5ESS switch.

Reference should now be made to FIG. 2 which depicts the divisions of switching module memory in the 5ESS switch.

The memory data base layout for each switch module begins with the "control" areas. There are two such areas shown in FIG. 2, one for Non-Redundant Office Dependent Data (NRODD), and another for Redundant Office Dependent Data (RODD). The NRODD memory area is memory dedicated to storing SM specific translation information, i.e., information specific to each individual SM in a given switching system. The RODD memory area stores information shared by all SMs in a given switching system, i.e., common information duplicated on each SM.

The Non-Redundant control area is shown as block 201 in FIG. 2 while the Redundant control area is shown as block 202. Each control area in the 5ESS architecture is maximized, meaning that it is large enough to control up to the largest NRODD, or RODD permitted without regard as to the actual size of the Office Dependent Data (ODD) partitions provisioned on any specific switch module.

Each bit within the control area reflects the status of an individual 256 byte block of memory. Thus, for indicate that the twelfth block (bytes 3072 to 3328) is occupied; while a 1 in that bit position would then indicate that the block is available.

The next area within the data base structure depicted in FIG. 2 is "unprotected" area 203. The term unprotected indicates that the data is dynamic (changeable), and is usually associated with some phase of the call process. There are no copies made or maintained of dynamic data outside the switch module, hence the name unprotected area. An internal switch module corruption in this area is not usually repairable.

Following the unprotected area, FIG. 2 depicts "protected" areas 204 and 205. The term protected is used because these areas are backed up on administration module 101. The protected areas contain static data and include non-redundant office dependent data (NRODD), in block 204, and redundant office dependent data (RODD), in block 205. These areas are also shown in each SM depicted in FIG. 1.

The NRODD area 204 for a switch module contains information which is required for call processing based on the special features and services required by the specific lines and trunks which are assigned to that switch module. The protected non-redundant area 204 for each switch module is duplicated on administrative module 101 in files labeled "imodd__.out", where the indicates the switch module number.

Redundant information is stored in the memory of every switch module in the office without regard as to the nature of the lines and trunks connected. The protected redundant ODD (RODD) structure 205 is also backed up using the Administration Module 101. Only one file for RODD data is needed in Administration Module 101 since the data is redundant for each SM. This one file will be referred to hereinafter as the "imrodd.out" file.

The major distinction between non-redundant data and redundant data is that although there is an imodd__.out file for each switch module, there is only one imrodd.out which can be used to support any switch module.

The remaining partitions in the data base layout shown in FIG. 2 are stand alone billing memory 206 and unallocated memory 207. Area 206 is used to collect and store billing information between pollings of Administrative Module 101. Unallocated memory 207 is, as indicated by its descriptive name, memory that has not been allocated.

As indicated hereinbefore, the 5ESS switch uses a relational data base structure, i.e., one that separates information into functional units, and provides a method for defining specific data within a functional unit. In the 5ESS switch these functional units are called "relations", each having its own unique relational identifier. These relations provide a method of storage for sub-sets of information called "tuples". Each tuple contains specific data used during call processing. As explained in the background section herein, a tuple is accessed using its "key attribute(s)". As changes are performed, tuples will be inserted into, deleted from, or changed (which is really a deletion/insertion operation) within one or more relations.

When additional memory is needed, available memory is allocated (by a data base manager) in blocks of 256 bytes. These blocks can be allocated consecutively to create pages ranging in size from 256 bytes (one block) to 8192 bytes (32 blocks). Each page of allocated blocks of memory has an identifier or block ID which is unique to that page.

Another important element of the data base structure located in each SM is the access dictionary located in each of the control areas of memory.

For the 5ESS switch (in particular generic version 5E4(2) and 5E5(1)), non-redundant files (imodd_.out), the access dictionary begins at offset 024720 octal and ends at offset 0110263 octal (or 0x90b4 hex). In redundant files mrodd.out, the access dictionary starts at offset 024544 octal and ends at 044144 octal (or 0x4864 hex). The end of the access dictionary is also the beginning of the actual data.

The access dictionary is divided into blocks of 256 bytes. Each block contains information pertaining to nine relations, using 28 bytes per relation (28 * 9=252), and a four byte padding to fill up the block (252+4=256=one block). The 28 bytes for each relation are divided into fourteen groups of two bytes each, with the following information:

1st two bytes: relation ID (acc_rid).
2nd two bytes: current deleted tuple count (acc_dlnm).
3rd two bytes: head table block ID (acc_head).
4th two bytes: various bit flags—acc_rcnt; acc_wflag; acc_oflag; rel_stgcls; acc_foldtyp; acc_lprobe.
5th two bytes: number of tuples per page (acc_tpag).
6th two bytes: number of data pages (acc_npag).
7th two bytes: forward list index (acc_nidx).
8th two bytes: backward list index (acc_bidx).
9th two bytes: head table size (rel_hsze).
10th two bytes: data page size (rel_dsze).
11th two bytes: intermediate table size (rel_isze).
12th two bytes: number of variable data pages per fixed data pages (rel_vdpnum).
last four bytes: maximum number of tuples the relation can hold (rel_tmax).

The access dictionary is utilized by the invention as a device for locating the data in a specified relation. Data location information is provided, for example, by the head table block ID, head table size, intermediate table information (where appropriate), etc., depending on the particular access method associated with the relation being analyzed. It should be noted that the access dictionary contains an entry for every relation, regardless of whether the relation is populated or not.

Figure 3:
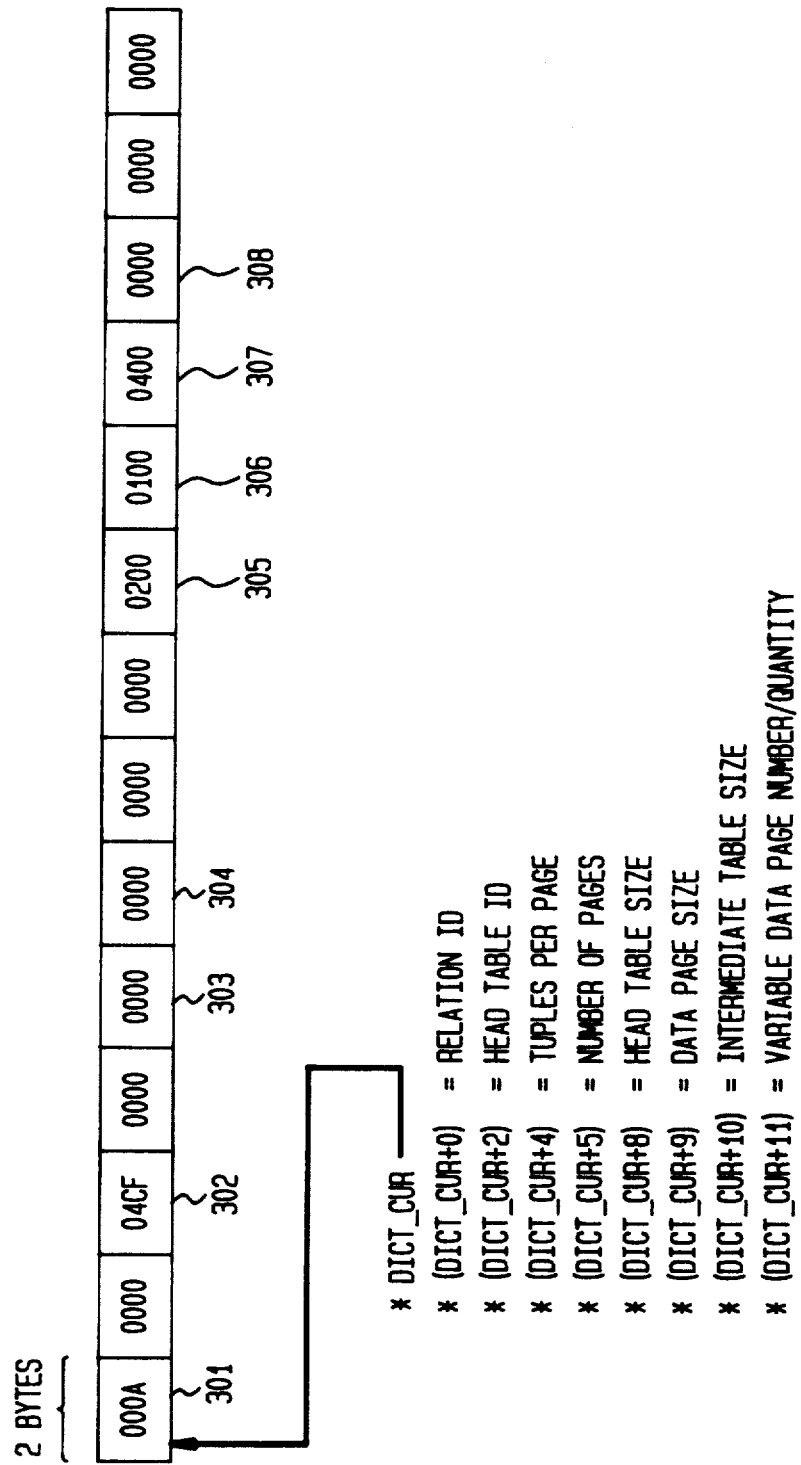
FIG. 3 depicts a representative entry in an access dictionary used by one embodiment of the invention for locating data pages in a specified relation and obtaining data regarding the structure of the relation.

FIG. 3 depicts a representative entry in one of the access dictionaries. The start of the access dictionary shown is assumed to be at address Dict_cur. The first two bytes, 301, is the relation ID number (acc_rid), a hex (10 decimal) in the example depicted in FIG. 3. The relation ID may be utilized to access or query the access dictionary.

The third two bytes, 302, is the relation's access head (acc_head) which is the address of the relations head table (or data page for compacted indexed-single level relations, to be explained hereinafter). In the example depicted in FIG. 3, acc_head=04cf hex=1231 decimal.

The fifth two bytes, shown as 303 in FIG. 3, represent the number of tuples per page in this relation. The sixth two bytes, 304, represent the number of pages in this relation. The ninth two bytes, 305, represent the head table size and bytes. For the example depicted in FIG. 3, the head table size is 200 hex=512 decimal. The tenth two bytes, 306, is the relation's data page size in bytes, shown in the FIG. 3 example as 100 hex=256 decimal.

The eleventh two bytes, 307, is the intermediate table size, if there is an intermediate table. For the example depicted in FIG. 3 there is an intermediate table and its size is 400 hex=1024 decimal. The twelfth two bytes, 308, is the variable data page number/quantity.

Having described the access dictionary portion of a relational data base, the three main types of pages used in the 5ESS page architecture will now be described in greater detail. The three types of pages used within the ODD area are (1) head tables, (2) intermediate tables, and (3) data pages.

Head tables are pointed to by the head table block ID which, as indicated hereinabove, is found in the access dictionary. The information on the head table may be an intermediate data page block ID, a data page block ID or data itself, depending on the accessing structure built in for the relation. Head table sizes can be 256, 512, 1024, 2048, 4096 and 8192 bytes in length. When the head table is 256 bytes, then the head table block is the address of that block and only one block has been used; when the head table is 512 bytes, then two consecutive blocks of 256 bytes have been assembled and the head table block ID contained in the access dictionary is the address of these first two blocks, etc. There is only one head table for each relation in the switch module.

The intermediate table is a data structure used in multi-level compacted index relations (which will be explained hereinafter). An intermediate table is pointed to by the relation's head table and it contains only data page identifiers (IDs). This extra level allows a greater quantity of data pages than when only the head page is used to point to data pages. Intermediate table sizes are 256, 512, 1024, 2048, 4096 and 8192 bytes. If the intermediate table requires 256 bytes, then a single block of 256 bytes is used. If the intermediate table size needs exceed 256 bytes then multiple consecutive blocks of 256 bytes are linked together to provide the needed space. More than one intermediate table may exist per relation.

Data pages are the data structures that provide the memory capacity to store tuples. Data page sizes are 256, 512, 1024, 2048, 4096 and 8192 bytes. If for example, a data page is designed to be 256 bytes long then a single block may be used for a data page. If data page length exceeds 256 bytes, then multiple consecutive blocks of 256 bytes are linked together to provide the needed space. Data pages are pointed to by either the access dictionary, a head table, or an intermediate table. Data pages are used in different ways depending on the type of data accessing method adopted for the specific relation. More than one data page may exist per relation.

When the only tuple on a data page is deleted, the page should be put back, by the data base manager, on a list of available pages. Head pages and intermediate data pages do not conform to this method in the 5ESS switch through generic version 5E5(1). Even if the only page ID is removed from either a head page or an intermediate page, the page is not reacquired onto the available block list.

The following is an example of how the access dictionary and the page architecture described hereinabove are utilized in the 5ESS switch. A customer dials a code which is translated to indicate a request for abbreviated dialing (speed calling). The access dictionary is queried for several pieces of data, one of which is the name of the head block that is the start of the trail which will lead to the indicated dialed entry in the proper abbreviated dialing list for the line that originated the call request. The head table start address is indexed by the key, which in this case is a combination of the list name, usually the calling directory number, and the position on the list to be outpulsed. The result is the data page block identifier (block ID). The block ID is converted into an address and again the address is modified or indexed by portions of the key which have been manipulated. The result is the telephone number to outpulse.

Having described the 5ESS page architecture, suitable methods which may be used to store and retrieve data (depending on application, speed requirements, etc.) will now be reviewed.

There are seven basic methods used to store and access data in a relational data base. These methods are (1) direct access; (2) linear access; (3) index access; (4) compacted index access; (5) compacted indexing with tuple compaction; (6) hash; and (7) hash with tuple compaction.

The direct access method is prevalently used by dynamic relations and accordingly will not be discussed further herein.

Figure 4:
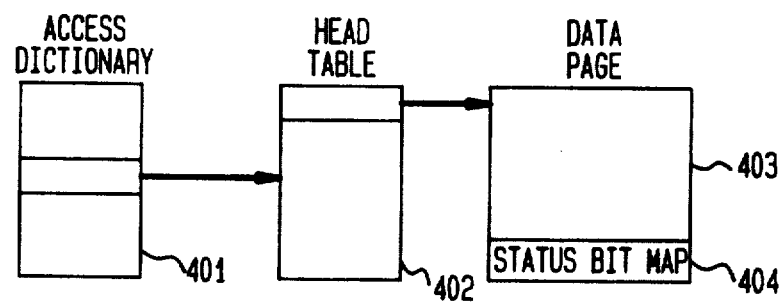
FIG. 4 depicts, in block diagram form, an exemplary access dictionary being utilized to point to an illustrative relation's head table containing one or more data page identifiers, which in turn points to the data page(s). Both linear and hashed data access methods utilize the depicted access dictionary and head table to locate data pages. Additionally.

The linear access method uses the access dictionary to point to a head table. The head table contains one or more data page identifiers, which point to data pages. This is depicted in FIG. 4 where access dictionary 401 may be seen pointing to head table 402 which in turn points to data page 403.

For relations that use the linear method, tuples on data pages contain both data and the key that was used to store the data. The look up begins with the first entry on the data page. Comparisons are made using the key from the call process under way and the key which is stored with the data in each tuple. These comparisons continue until either the correct tuple is found or the end of the data page is reached. If the end of the page is reached without finding the correct tuple, then the data page pointed to by the next data page ID on the head table is read. This process continues until the correct tuple is either found or the last tuple on the last data page is read without finding the correct key.

Each data page also contains a "status bit map" (shown as 404 in FIG. 4), which is stored at the end of the page in regular byte format. Each bit in the status bit map is used to indicate whether a particular tuple position is either active or inactive, i.e., whether the tuple contains active data or not. The status bit map is read (in the 5ESS switch context) from right to left (bottom up), and refers to tuples on that data page from left to right (top down). This means that the last bit on the data page refers to the first tuple on the page; the second to last bit refers to the second tuple position, and so on. Therefore, each byte in the status bit map refers to the activity state of eight tuples. When the number of tuples per data page is not evenly divisible by eight, the leftmost byte of the status bit map (the byte with the lowest address) will refer to less than eight tuples. Also, if between the highest tuple and the beginning of the status bit map there is a buffered area of bytes less than the size of a tuple, then those bytes are considered to be unused overhead.

In the status bit maps employed in the 5ESS switch, if a bit is equal to one then the corresponding tuple is inactive, and if the bit is equal to zero then the corresponding tuple is active. When data is deleted from the data page, only the appropriate status bit within the bit map is changed. The stored tuple itself is left unaltered.

The index access method in the present generic versions of the 5ESS switch applies only to dynamic relations, and therefore will not be discussed further herein except to say that the relation ID is used to query the access dictionary for the head table ID. There are two variations of the index method, one called single level which places the data on the head table, while the other is called double level which uses the head table to store data page IDs that point to individual data pages.

The compacted index method shares much of the structure of the index method. The primary difference between the two lies in the way in which the key to the relation is manipulated. The objective of this method is to achieve a limited quantity of densely packed data pages. There are three variations of the compacted index access method which are illustrated in FIGS. 5-7, referred to hereinafter as a level 1, 2 or 3 compacted index method.

Figure 5:
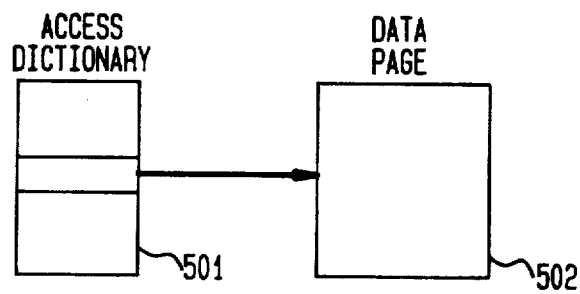
FIG. 5 depicts, in block diagram form, an exemplary access dictionary being utilized to directly point to a data page, in an illustrative relation, in support of a compacted index level 1 data access method.

For a level 1 compacted index method, the entry in the access dictionary (block 501 in FIG. 5) for the relation points directly to the data page (block 502 in FIG. 5). No head table structure exits. Only one data page may exist using this method.

Figure 6:
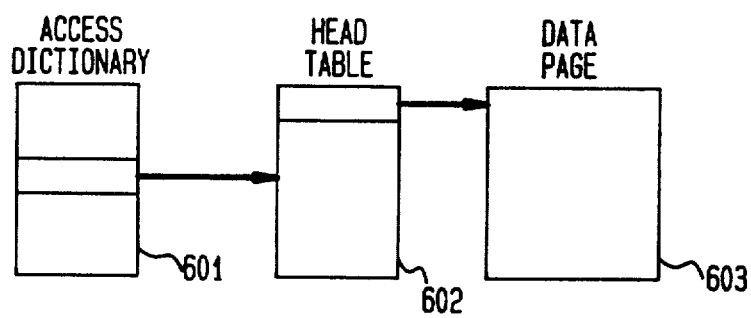
FIG. 6 depicts, in block diagram form, an exemplary access dictionary being utilized to point to a head table which in turn points to a data page in an illustrative relation being accessed via a compacted index level 2 data access method.

For a level 2 compacted index method, the entry in the access dictionary (block 601 in FIG. 6) for the relation points to the head table (block 602 in FIG. 6) which points to one or more data page pages (like block 603 in FIG. 6).

Figure 7:
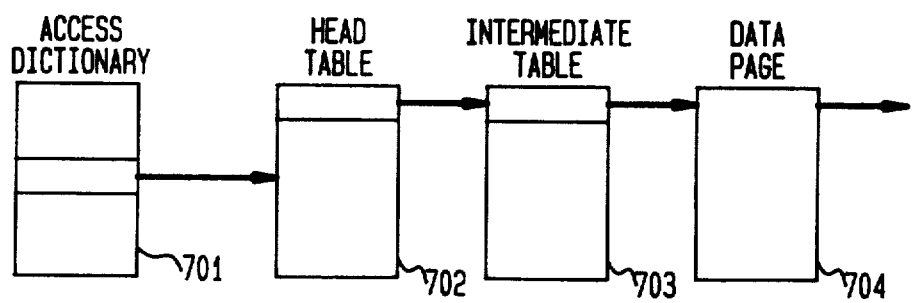
FIG. 7 depicts, in block diagram form, an exemplary access dictionary being utilized to point to a head table which in turn points to an intermediate table that is used to point to a data page in an illustrative relation being accessed via a compacted index level 3 data access method.

For a level 3 compacted index method, the entry in the access dictionary (block 701 in FIG. 7) for the relation points to the head table (block 702 in FIG. 7). Head table 702 points to one or more intermediate tables (like block 703 in FIG. 7). The intermediate table(s) point to one or more data page pages (like block 704 in FIG. 7).

A further variation of the compacted index method called tuple compaction exists. Seldom used, this method provides a way to store tuples of varying length while refraining from reserving maximum length space for every tuple. Neither the index method nor the compacted index method include the key as part of the stored tuple, because in essence a reservation is made for each tuple space and only one key can point there. However, the tuple compaction architecture has the advantage of only using the amount of memory space needed to record the reduced feature compliment required by customers.

Figure 8:
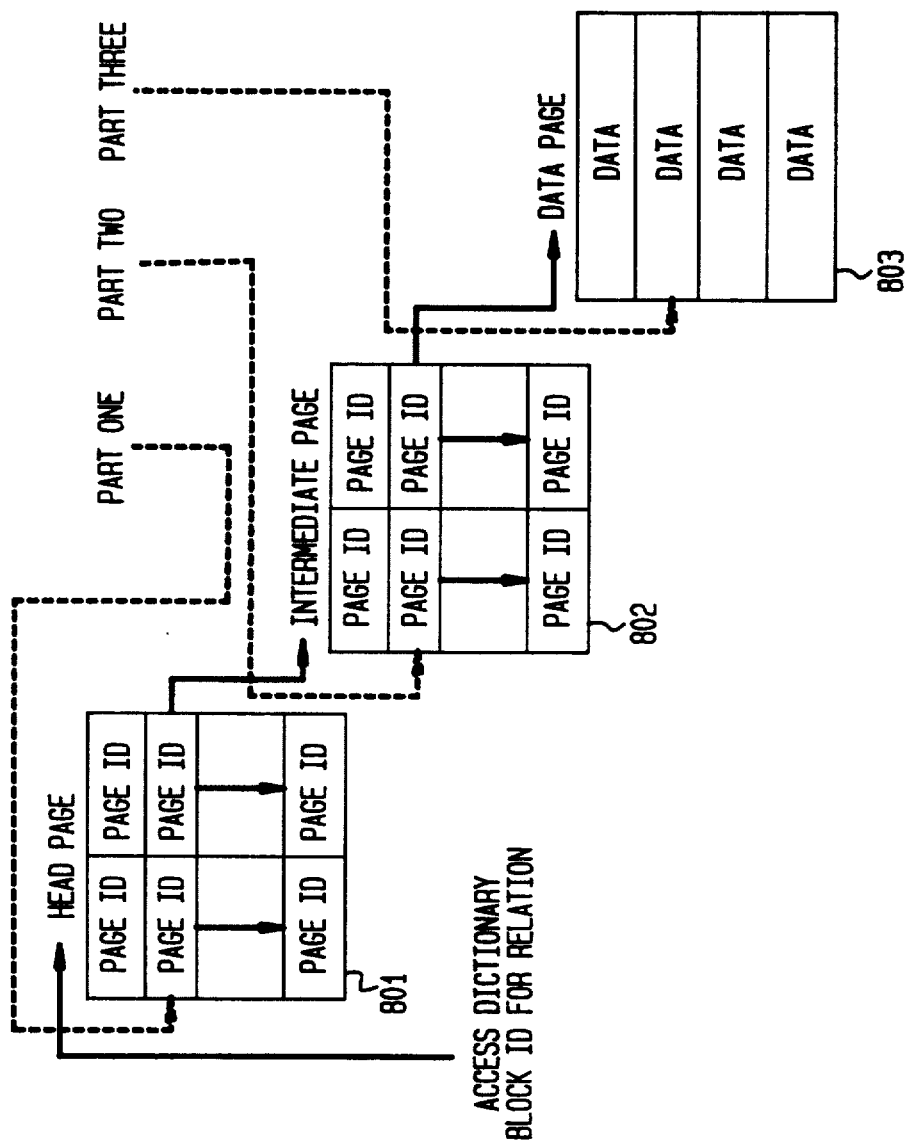
FIG. 8 depicts the key, for a relation that utilizes tuple compaction, being divided into three parts to access head table, intermediate table and data page information.

The few relations in the 5ESS switch (through at least generic version 5E4(2) that utilize tuple compaction are of the level three variety. As shown in FIG. 8, the key is divided into three parts (parts 1, 2 and 3) respectively pointing to the head table, intermediate data table(s), and data page(s), shown as 801-803 in FIG. 8.

The tuple compaction variation is that there are two additional versions of data pages. The first type of data page is called the "fixed data page" and is pointed to by the intermediate data page. Fixed data pages contain "fixed part tuples" which are used to point indirectly to the second type of data page called "variable data page(s)". The size of the fixed part tuple is predefined. The architecture (through at least generic version 5E4(2)) provides that a fixed data page can have more than one variable data page. The maximum number of variable data pages is controlled by an access dictionary attribute called "rel_vdpnum", which is the variable data page number/quantity. This attribute, as depicted in FIG. 3, is located at address Dict_cur+11 in the access dictionary.

A fixed data page is pointed to by the intermediate data table. The structure is that the first data page block ID position on the intermediate data table will be taken up by the fixed data page and the next position(s) will be occupied by its variable data page(s). The total quantity of variable data pages cannot exceed the from the access dictionary. When the value of rel_vdpnum fixed part tuple is found, it will contain a variable data page index which is applied on the intermediate data page from the position of the fixed data page and will result in the correct variable data page ID.

As an example, consider one fixed data page with 5 variable data pages associated with it. If in the fixed part tuple, the variable data page index was equal to 1, then going back to the intermediate data page, 1 is added to the address of the fixed data page ID. The page ID of the correct variable data page is then read. Another field within the fixed part tuple called the "byte offset" is used to determine how far down the data page to index in order to find the correct variable part tuple. Each variable part tuple contains both the data and a value which defines its size. The maximum size of the combination of the fixed part tuple and the variable part tuple is also predefined for each relation.

The next access method to be reviewed is the hashed access method. The objective of hashed relations is fast data access time combined with sparsely populated data pages. The relational ID is used to query the access dictionary from which a head table block ID is returned. The key is mathematically manipulated, with modulo arithmetic. This is a division function that uses the remainder as a result to offset into both the head table and the data page as may be seen with reference to FIG. 9. The result of offsetting head table 901 with the first modulo result is the data page block ID (e.g., ID 904 in FIG. 9, if the offset is "1"). The second modulo result is used as the offset into the data page, as shown with reference to data page 902 in FIG. 9.

The key in the tuple is compared to the key of the calling process. If the keys do not match, then it is assumed that a collision has occurred. When a collision occurs, the next three sequential tuples, keys (e.g., key 905–907 in FIG. 9) are read one at a time looking for a match. If a match occurs with any of the three, the data is used. If none of the keys match, then the "primary overflow" area 910–913 of the data page which contains capacity for up to four tuples is read looking for a key match.

Figure 9:
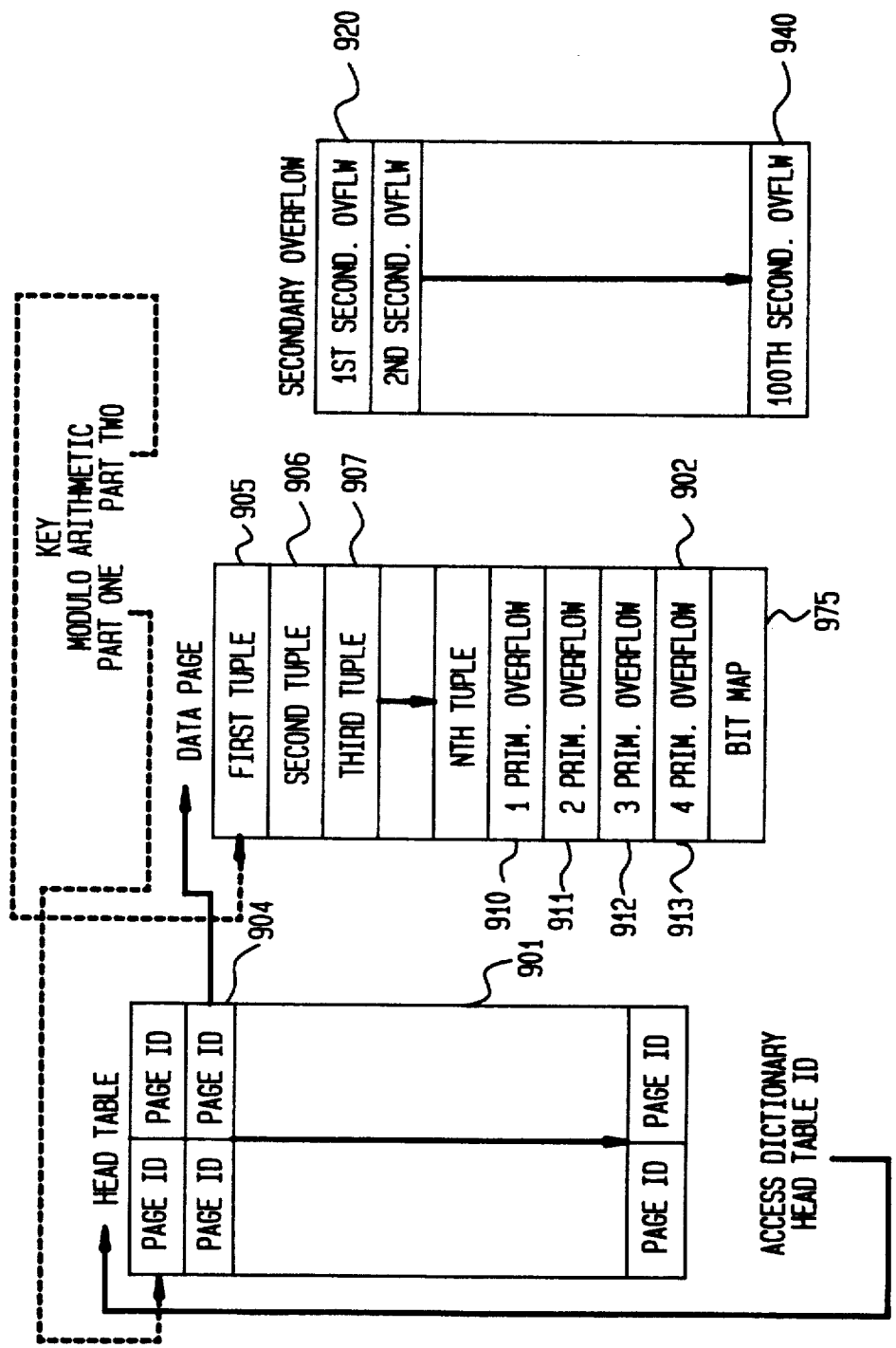
FIG. 9 depicts the use of a mathematically manipulated key to access head table data page information in a relation created utilizing hashed data storage and access techniques.

The primary area in FIG. 9 is shown to contain slots for four tuples labeled 910–913. If any of the four keys match, then the data is used. If none of these keys match, then the search continues into the secondary overflow area shown as area 920 in FIG. 9. Secondary overflow areas are additional data pages which are populated with tuples that do not fit on their respective data pages. Secondary overflow pages are the same size as the primary data page and are read from top to bottom in a sequential fashion attempting to match the key. If a match is found the data is used. There may be more than one secondary overflow page for a relation. For example, page 940 in FIG. 9 is shown as the 100th secondary overflow page for the depicted relation.

Secondary overflow pages exist for the entire relation but have no direct relationship with any specific data pages. Periodically, a "re-ordering" occurs to move tuples from secondary overflow pages to primary data pages, thereby reducing the access time of a calling process.

The reason for matching the keys is that the modulo arithmetic process can result in more than one key yielding identical address results. Therefore, in order to limit the incidence of collision, and to insure high speed look-ups by finding the correct tuple on the initial read in a high percentage of cases, multiple sparsely populated data pages are utilized.

Each hashed data page maintains a "status bit map" (block 975 in FIG. 9) which is used to keep track of the activity state of the tuples on the data page. The status bit map has the same format as in relations with the linear accessing method. An overview of the data structure used in the hashed access method may be summarized with reference to FIG. 4, previously described herein with reference to the linear access method.

An additional variation of hashed access is hashed compaction. The architecture for this method is quite similar to that of compacted indexing with compaction with the following distinctions: (1) fixed part tuples contain the key attribute and so they will tend to vary in size depending on the relation. This occurs because key lengths themselves tend to vary from relation to relation. Compacted indexing with compaction relations do not contain keys and so are fixed in size among all relations; and (2) the location of both the fixed data page and the variable data page are found on the head table. Compacted index relations with tuple compaction locate page IDs on the intermediate data table.

Figure 10:
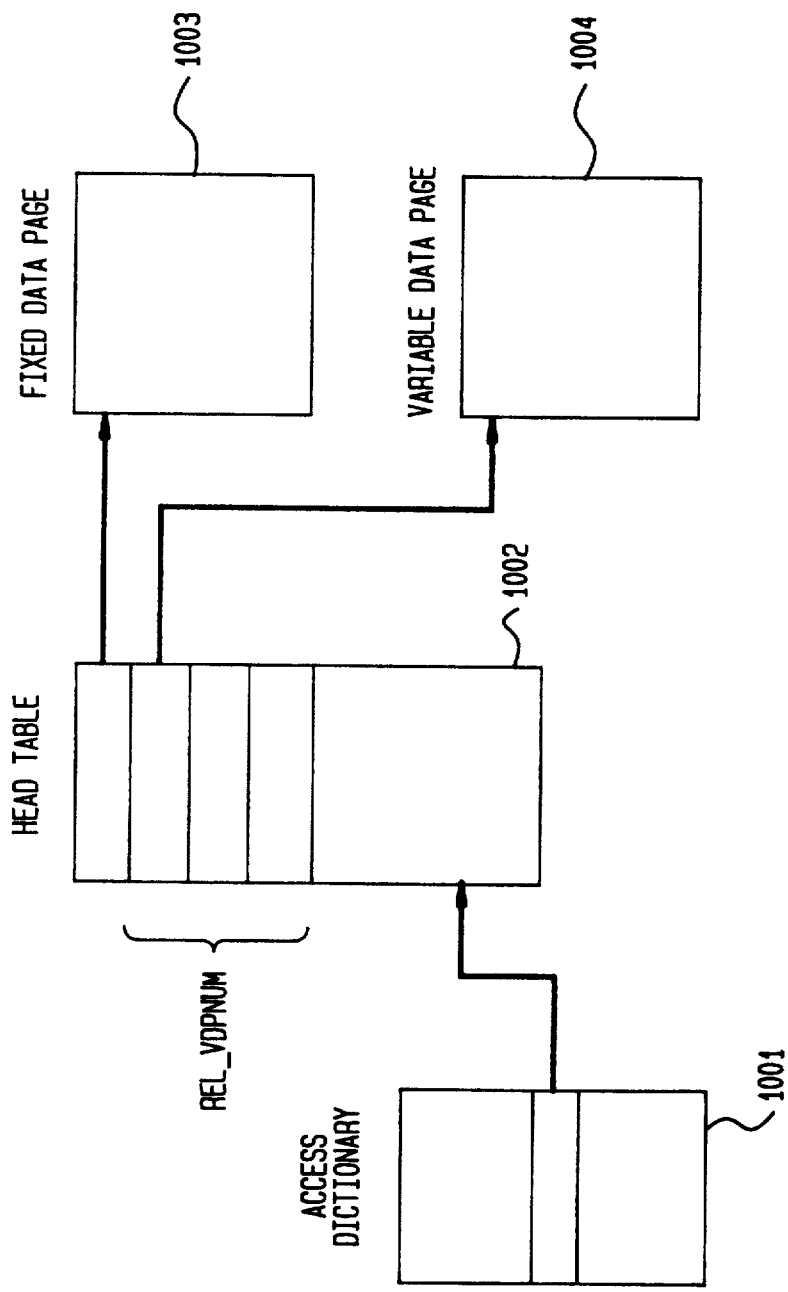
FIG. 10 depicts, in block diagram form, how an access dictionary pointing into a head table may be used to locate fixed and variable data pages associated with a compacted hashed data access method.

Variable data pages are the same size as fixed data pages and also have a bit map. An overview of the compacted hashed access method is shown in FIG. 10 where the access dictionary, 1001, is shown pointing into head table 1002, which in turn may be used to locate fixed and variable data pages 1003 and 1004 respectively, where the quantity of variable pages is controlled by the previously mentioned attribute rel_vdpnum.

Having described both the 5ESS page architecture and suitable methods that may be used to store and retrieve data, a functional description of the aforementioned COMAP embodiment of the invention will now be set forth with reference to FIG. 11.

The terms utilized in the following description (and the flowchart) will first be defined to aid in understanding the principles of the invention.

The term "list.files" is defined as a file that contains a list of binary data base ODD files that are to be deciphered. The convention used in the COMAP embodiment of the invention is that the first line of the file contains only the generic of the ODD files that are listed afterwards. Starting with the second line, each line contains the full path name of one ODD file. No empty lines appear in the file and the file should be located in the same directory as COMAP.

The term "imoddlist.x_y", where x and y specify the generic version of a switch, refers to a list of non-redundant relations to be processed. The relations that may be included in the imoddlist.x_y file are those that are located in the static protected portion of a SM.

The convention used in the COMAP embodiment of the invention is that no empty lines should appear in the file and each line should consist of six columns, where each column is delimited by a space or tab.

According to the preferred embodiment of the invention, the six columns are for specifying the following information:

Column 1: Relation ID in decimal.
Column 2: Relation name.
Column 3: Access method, where for example, 0=Hash; 1=Linear; 2=Compacted Index; and 3=Compacted Hash.
Column 4: Internal representation size of each tuple, except for relations which have a compacted hash access type. In these relations, the fourth column contains a value which compensates for reading only the fixed data pages, instead of also reading the variable data pages.
Column 5: Indexing level (1, 2, or 3) for a compacted index relation, or 0 for all other access methods.
Column 6: Differentiating between a redundant and non-redundant relation, where for example, 0 could be used to specify a non-redundant relation while 1 specifies a redundant relation.

The imoddlist.x_y file, like list.files, should be located in the same directory as COMAP.

The term "imroddlist.x_y, where x and y specify the generic version of a switch, refers to a list of redundant relations to be processed. The relations that may be included in the imroddlist.x_y file, like those that may be included in the imoddlist.x_y file, are relations that are located in the static protected portion of a SM. Each line in the imroddlist.x_y file has, according to a preferred embodiment of the invention, the same six column data requirements as the imoddlist.x_y file, described hereinabove.

COMAP also requires the actual binary data base files (imodd_.out and imrodd.out) in their appropriate directories. These files can be located anywhere in the file system, with corresponding full path names found in list.files. In the preferred embodiment of the invention utilized in the telephone switching context, these files are divided, for easy handling, by originating location (e.g., Newark, Sunnyvale, etc.). Even if two ODD files are taken from different locations, if they have identical names, they must be kept in different directories to avoid a conflict.

Having defined the terminology that will be utilized to explain the operation of COMAP, attention will now be directed to the inputs and outputs of this embodiment of a program that supports the invention.

COMAP has two levels of input. The first level is the file list.files which, as explained hereinabove, contains one full path name per line of an ODD file to be processed, and the list of relations to be processed.

It should be noted that list.files and the list of relations to be processed can be created with any word processor.

The second level of input is each individual binary ODD file to be analyzed. These ODD files (imrodd.out and imodd_.out) may be copied from administrative module 101 (as shown in FIG. 1), onto magnetic tape (shown as 104 in FIG. 1) using, for example, the UNIX (UNIX is a registered trademark of AT&T) cpio command. Therefore, these files are exact duplicates of the binary data base files found on the 5ESS switch.

For each input ODD file (for example, imodd31.out), COMAP creates four output files: a statistical file (imodd31.stat), a verbose file (imodd31.verb), and empty data page file (imodd31.empty), and an in-range file (imodd31.range). A preferred embodiment of these four output files will now be described.

The first file (_.stat) contains statistical information on the allocation and usage of memory in the head table, intermediate tables, and data pages for each relation. This information may, for example, be utilized for regression analysis to develop memory requirement forecasts, etc.

The _.stat file is, according to a preferred embodiment of the invention, divided into 16 columns which contain the following output information:
Column 1: Relation ID in decimal.
Column 2: Relation name.
The next three columns refer to the head table:
Column 3: Bytes allocated.
Column 4. Bytes used.
Column 5: Percent fill.
The next four columns refer to the intermediate tables:
Column 6: Bytes allocated.
Column 7: Bytes used.
Column 8: Average percent fill.
Column 9: Standard deviation.
The next six columns refer to the data pages:
Column 10: Bytes allocated.
Column 11: Bytes used. This column includes bytes used for tuples and for the status bit map (when appropriate). Bytes lost due to the unused buffer zone after the last tuple, are not included.
Column 12: Maximum number of tuples possible in memory allocated.
Column 13: Number of tuples occupied.
Column 14: Average percent fill.
Column 15: Standard deviation.
Column 16: Contains an asterisk if encountered an out of range ID. It is a signal to look at _.verb and _.range files for more information.

The last line in the _.stat file contains the total in that switch module for each of columns 3 through 15.

The next output file (_.verb) contains information about every occupied block in the data base relating to trouble analysis. Through this file the user can tell if there is a problem with data, the switch or COMAP itself.

For each relation, _.verb states the ID, name and access method. If the relation is occupied, then information about the head table, intermediate tables and data pages are supplied as appropriate. For each data page, the file contains the page ID (dpgid) in hex, the maximum number of tuples for that page (max tups), and the percent fill for that page (per fill). For each intermediate table (where appropriate) _.verb lists the table ID (intermediate table ID) in hex, all of the data pages pointed to by that intermediate table, and then the percent fill for that intermediate table.

For the head table, _.verb lists all intermediate tables or data pages pointed to from the head table, followed by the percent fill for the head table. The last line of the file contains a count of all the occupied relations.

The third output file is _.empty. According to the design of the 5ESS switch, when the last tuple of a page is deleted, the whole page should be returned to available free memory. This is not required to happen when head and intermediate tables are used. _.empty is a list of all relations having empty data pages. The file consists of 5 columns as follows:
Column 1: Relation ID in decimal.
Column 2: Relation name.
Column 3: Number of empty data pages.
Column 4: Bytes allocated per data page.
Column 5: Total number of bytes unused in that relation due to empty data pages.

The last line of the __.empty file contains the total number of empty data pages and the total number of unused bytes for the particular SM under analysis.

The last COMAP output file is __.range, which contains any table or page ID that is out of range for the SM ODD file being analyzed.

An ID is below range if it is less than "dbunblocks" (for a non-redundant file) or "rf__block" (for a redundant file). Dbunblocks and rf__block are, by convention in the 5ESS switch, the pointers to the first block of memory in the non-redundant and redundant files respectively, in each SM. If after converting the ID into an offset, the offset is greater than the size of the switch module ODD file, then the ID is above range.

The __.range file may be used to help detect if there is any corrupted data in an ODD file.

Figure 11:
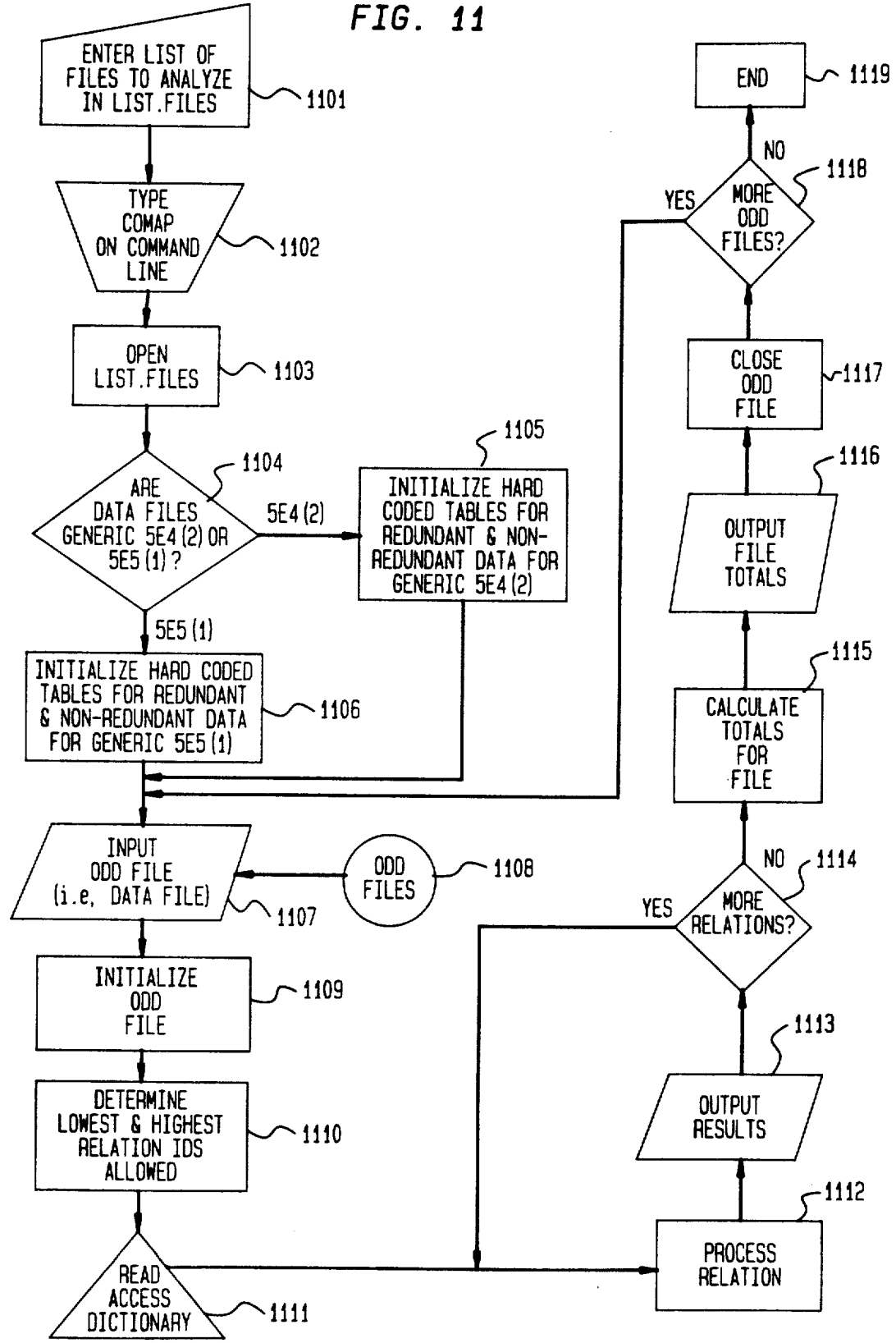
FIG. 11 is flowchart depicting, in functional terms, one embodiment of the invention.

Having described both the inputs and outputs t COMAP, reference should now be made to the flowchart in FIG. 11, in conjunction with the following description, to understand how this one embodiment of a program for supporting the invention operates.

The functional description to be set forth with reference to COMAP per se will be understood by those skilled in the art to be applicable for use in developing general purpose memory analyzers (i.e., for use in other telephone switching systems and non-telephone switching system environments), for analyzing the population of relational data bases According to the illustrative embodiment of the invention, COMAP starts out by opening the file "list-.files" to access the list of ODD files which should be processed. As indicated hereinabove, the first line of this file should contain the generic of the ODD files that follow. After this first line, the list is in the format of one full path name for a ODD file per line. All of the ODD files should come from 5ESS switches that are utilizing the same generic edition.

Block 1101 in FIG. 11, represents the entering of list.files into an offline digital computer that is used for performing the data base analysis contemplated herein.

Block 1102 in FIG. 11, represents user interaction to bring COMAP online (for example, by typing in a COMAP online command).

Block 1103 in FIG. 11, represents the aforementioned opening of list.files.

Blocks 1104-1106 in FIG. 11, represents the determination being made as to the generic version of the switch when two exemplary versions of the 5ESS switch are possible. The exemplary versions shown are the commercially available 5E4(2) and the more recent commercially available 5E5(1) versions of the switch. After determining which version is to be analyzed (since, as indicated hereinbefore, different versions have different addressing structures, etc.), COMAP initializes two hard coded tables—one called Nrtable for non-redundant ODD files and one called Rtable for redundant ODD files. This process is done once for the duration of the run no matter how many ODD files are to be processed.

The hard coded tables list each relation to be processed and contain other relation dependent information as specified in the imoddlist.x__y and imroddlist.x__y input files.

At this point, COMAP reaches a steady state that will continue until there are no more files listed in list.files. The main loop of the program consists of the following:
1. Get next ODD file from "list files"
2. Initialize the ODD and output files
3. Get the lowest and highest IDs allowed
4. Read in the access dictionary
5. Process each relation and output results
6. Output total results for the ODD file
7. Close ODD file
8. Return to get next ODD file (step 1)

Each step will now be described in detail with continued reference to FIG. 11.

The first function "get__nextfile()", reads the next line in list.files and loads the full path name into a buffer (Nextfile). The function also returns a pointer to this buffer which main () assigns to Filepath. Also, main () prints to standard output the name of the ODD file it is about to process. This allows the user to see where COMAP is holding in regard to all the ODD files in process. The get__nextfile () function is shown in FIG. 11 taking place at block 1107 (input ODD file). The input shown at 1108 may be thought of as the files copied onto unit 104 in FIG. 1, via Administrative Module 101, i.e., the actual binary files to be processed.

Next, COMAP initializes the ODD and output files utilizing the functions init__file(); strip__path(); ptr__assign(); make__outfiles(); test__swab__; and swab__it(), all of which are described hereinafter. Block 1109 in FIG. 11 is meant to encompass this steady state initialization phase of COMAP's operation (i.e., initializing is performed each time a new ODD file is read into the offline digital computer).

Init__file() controls all the file creation and initialization of the ODD file and the output files. After opening the ODD file, init__file() calls strip__path() which returns a pointer to the actual file name without the path. For example, if the full path name is /mre7/memory/newark/imodd8.out then strip__path() will return a pointer to imodd8.out. If there was no path but just a file name, then strip__path() will also return a pointer to the file name. In either case, the original string is not changed, and only a pointer to part of it is returned. Init__file() then sends this pointer to ptr assign(), which tests the file name to see if it is a non-redundant or redundant ODD file. Based on the result, the function initializes Filetype to REDUNDANT or NONREDUNDANT, Hct__cur to point to the first relation in Rtable or Nrtable (they contain the hard coded tables), and Dict__cur to point to the beginning of the appropriate access dictionary.

Next, init__file() calls make__outfiles() to create full path names and open the four output files. Also, swabpath will contain the full path name for the file used during swabbing. In all these cases, the files will be in the same directory as the ODD file itself.

The last part of init__file() makes sure the ODD file is in the proper byte format for the machine hardware to read. In the 5ESS switch, all of the information is in the format of short integers (two byte segments). Different computers read short integers in different manners. Some computers (such as the ATT 3B20, a registered trademark of AT&T), store short integers with the high order byte in the byte of memory with the low address, and the low order byte in the byte of memory with the higher address. Other computers like the DEC VAX (registered trademarks of Digital Equipment Corporation), store the high order byte in the byte of the memory with the higher address, and the low order byte in the byte of memory with the lower address.

In order to insure that COMAP will read the ODD file in the proper format, init_file() calls text swab() to see if it can correctly read the first two bytes of the access dictionary. For example, in a non-redundant ODD file, the first short integer of the access dictionary should be 0×0009 (hex). If the machine which is running COMAP reads that short integer correctly, then test swab() returns TRUE. If it reads the short integer as 0×0900 (hex), then text_swab() returns FALSE. Finally, if the number returned is not 0×0009 or 0×0900, then an error has occurred and that ODD file will not be processed because we see that it contains corrupted data. If text_swab() returned FALSE (meaning that the computer read a short integer in reversed format) then init_file() calls swab_it() to swab the ODD file. Swabbing means that for every two bytes in a file, the low and high address bytes are switched. Now the computer will be able to read the information on the 5ESS switch correctly.

Next, COMAP determines the lowest and highest relation IDs allowed via the functions get_firstid(); and get_endid().

Every block of memory (256 bytes) has a unique identifier "pointing" to it. In a non-redundant ODD file the pointer to the first block of memory is, as indicated hereinbefore, referred to as dbunblocks, while in a redundant ODD file this pointer is referred to as rf_block. The offset of dbunblocks is 020320 octal, and the offset of rf_block is at 020754. Both dbunblocks and rf_block are short integer (two byte) values. Depending on Filetype (REDUNDANT or NONREDUNDANT), get_firstid() initializes first_id, by setting it equal to the proper variable (rf_block or dbunblocks).

Just like there is an identifier for the first block of memory, so too there is an ID "pointing" to the last block. However, this pointer can vary depending upon the size of the ODD file. The function get_endid() assigns this ID to end_id. The function get endid() gets the offset of the last byte in the ODD file and translates this offset into an ID by reversing the equation used to translate an ID into an offset.

These two IDs, one for the first block of memory and one for the last block, are used as an error check to see if all the IDs found in a particular ODD file are within range for the size of the file.

After obtaining the lowest and highest IDs allowed as indicated by block 1110 in FIG. 11, the appropriate access dictionary is read (shown at block 1111 in FIG.11), via the function get_accdict().

As indicated hereinbefore, the 5ESS switch uses the access dictionary as a direction indicating structure. The access dictionary (Acc_dict), previously described herein with reference to FIG. 3, is a two dimensional array of short integers, structured as fourteen across and a maximized length down depending upon Filetype (redundant or non-redundant).

It should be recalled that each line in Acc_dict contains information about one relation, and these relations are ordered in an ascending fashion. The pointer Dict cur (which was initialized in init_file()), points to the first short integer of the relation in the access dictionary. This is also depicted in FIG. 3 and was described hereinbefore.

Using C language pointer arithmetic, one is able to access each short integer for the relation being processed. Furthermore, as indicated hereinbefore, the relevant information in the access dictionary for COMAP is the relation ID, the head table ID, tuples per page, number of data pages, head table size, data page size, intermediate table size, and variable data page number/quantity.

In order to increment Dict_cur to point to the start of the next relation in the access dictionary, all that needs to be done is to add 14 (the number of two byte pairs per access dictionary entry) to the current value (position) of Dict_cur.

COMAP next processes each relation and outputs data population results. The processing and output functions of COMAP are depicted in FIG. 11 at blocks 1112 and 1113. The functions utilized to perform the processing and output steps are get_relations(); range_check(); get_startoff(); read_datapg(); read_comphash(); read_headtable(); read_interpage(); add_em(); results(); get_section(); bitmap_size(); stat_bitmap(); straight_read(); and get_id().

Function get_relations() is the control entity for this portion of the COMAP program. While there are more relations in the hard coded table to be processed, get_relations() increments Dict cur (the pointer into the access dictionary) to point to the same relation as is currently being represented by a pointer into the hard coded table (Hct_cur) indicating the next relation to be processed.

After initializing the output structure (the aforementioned structure to store all information about the current relation), get_relations() assigns the head table ID to hpid. If it is an occupied relation (hpid is not all zeros or not all ones), then COMAP is ready to process the relation. First, a test is performed to determine if hpid is in range for the current ODD file by calling range_check(), which tests that the ID is between first_id and end_id. If it is, then hpid is converted into a number equivalent to the offset into the ODD file of the first byte of the head table. This conversion is done in get_startoff() using the following formulas:

for a non-redundant file: (id—dbunblocks) * BLOCKSIZE + NR_DATASTART for a redundant file: (id—rf_block) * BLOCKSIZE + R_DATASTART At this point, COMAP calls different functions depending upon the access method of the current relation. If the access type is compacted index level 1, then hpid points directly to a data page without any tables in between. In this event read_datapg() is called. If the access type is compacted hash then hpid points to a specially designed head table and read_comphash() is called. Finally, in all other access types hpid points to a regular head table and read_head table() is called.

The functions used to read all of the tables and pages are described as follows:

1. read_headtable() . The head table is structured so that every short integer (two bytes) contains another ID. These IDs point either to a data page or to an intermediate table, depending upon the access method of the relation. If the ID is empty (meaning that it does not point to anything), then those two bytes will be either all zeros or all ones, otherwise it is an active ID. Because there is no limit to the size of the head table, we cannot read it all in at once and use a pointer to go through each ID. However, in order to be as efficient as possible, read_headtable() calls get_section() which reads in part of the table, up to 1024 bytes (the maximum size of a disk read). By keeping track of how many bytes are in the table and how many we have already read in, we can use a pointer to go through the IDs of a section, and when that section is completed we get another section if needed. If the access method of the current relation is hash, linear, or compacted index level 2 then each occupied ID on the head table points to a data page, and read_datapg() is called. If the access method is compacted index level 3 then each ID points to an intermediate table, and read_interpage() is called.

2. read_interpage(). The intermediate table is structured in the same format as a head table, and therefore read_interpage() operates basically the same as read_headtable(). The only difference is that every ID on the intermediate table points to a data page and therefore each occupied ID ends up calling read_datapg().

3. read_comphash(). In compacted hash relations, the head table is structured in a unique way. After each fixed data page ID there are vdpnum variable data page IDs. If the fixed data page ID is unoccupied (all zeros or all ones), the next fixed data page ID is processed. However, if the fixed data page ID is occupied, read_datapg() is called (as usual), but occupied variable data page IDs are also looked for and the head_pg_byte_used variable is updated. Because compacted hash is not used starting with generic 5E5(1), a less efficient but easier method to read the head table is employed by COMAP. Instead of reducing the amount of disk reads by reading up to 1024 bytes at one time, 2 bytes are read each time an ID is needed.

4. read_datapg(). There are two ways that COMAP reads data pages. One method is to read only the status bit map, while the other method is to read each tuple on the page. Only hash, compacted hash, and linear access types have status bit maps, so in relations with these access types the size of the status bit map is first determined from bitmap_size(), and stat_bit_map() is then called to actually read the bit map. However, if the access type is compacted index, then straight_read() is called to sequentially read all the tuples on the data page. Both functions (status_bit_map() and straight_read()) return the number of vacant tuples on the data page. The number of vacant tuples is then used to update all of the output variables in the previously described COMAP output structure.

After reading all of the tables and pages for a particular relation, the average percent fill and the standard deviation are computed. Up to this point only the running total for the percent fill and standard deviation were kept. Now the average is created. The following formula may be used for the average fill:

1. Calculate the average percent fill for each page.
2. Keep a cumulative sum of the percent fill for all the pages (keep this sum in _pfill).
3. After processing all pages, divide the cumulative sum (_pfill) by the number of occupied pages.
4. The result in _pfill is the average percent fill.

The following formula may be used for the standard deviation:

1. Keep a cumulative sum of the square of the percent fill for each page. Keep this sum in _stddev.
2. After processing all pages and the average percent fill, divide the cumulative sum (_stddev) by the number of occupied pages.
3. Subtract the square of the average percent fill.

4. Get the absolute value.
5. Get the square root.
6. The result in _stddev is the standard deviation.

At this point, all of the information in the output structure is correct, so the results for the current relation being processed may be output. A function called results() is used by COMAP to provide this output.

Having finished processing this relation, the next relation (if any) may be processed. If another relation exists then Hct_cur is incremented to point to the next relation in the hard coded table and Dict_cur is moved until it points to the entry in the access dictionary that matches the relation referred to by Hct_cur. With all of the pointers set (if any more relations exist as determined at 1114 in FIG. 11), COMAP can return to block 1112 and process the next relation.

After all the relations in a given ODD file are processed, i.e., after all the relations listed in the hard coded table are processed, the bottom line results for that ODD file may be calculated and output via the function bottom_line(). Columns 3–15 of the _stat file may be calculated and output along with the number of occupied relations in the _.verb file. The calculation and output of file totals is shown in FIG. 11 as being performed at blocks 1115 and 1116 respectively.

Finally, COMAP closes the file descriptor to the ODD file just processed along with the file pointers to each of the output files via the function leave_file() shown as block 1117 in FIG. 11, and returns to block 1107 to read the path name of the next ODD file to be processed if any such files remain to be processed. This determination is made at 1118 in FIG. 11, and is followed by program termination (block 1119) when all files have been processed.

What has been described is a memory analyzer for a relational data base meeting all of the objectives set forth hereinbefore. Those skilled in the art will recognize that the foregoing description of a preferred embodiment of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed is:

1. A computer implemented method for performing relational data base memory utilization analysis for a data base having allocated memory such that memory actually utilized is determined, comprising the computer implemented steps of:
    (a) selecting a set of data base files to be analyzed;
    (b) specifying a set of relations, said set of relations being a selected subset of all of the relations located within said set of data base files, for which memory utilization information is to be determined, said relations including tuples for storing data, each tuple having a size and a data activity state from the group of states including active and inactive;

23

(c) identifying tuples of each said relation in said set of relations in the active state and thus actually storing data; and (d) determining the memory actually utilized for each said relation based upon said identified tuples and the size of said identified tuples such that the memory actually utilized in said specified set of relations within said selected set of data base files is determined.

2. A method as set forth in claim 1 wherein a plurality of said relations have a data page structure, said structure including a plurality of data pages and each said data page having a status bit map, said status bit map indicating said data activity state of each said tuple of said data page and wherein said step of identifying further comprises the step of detecting the contents of said status bit map of each said data page to determine whether the tuples of each said data page are in the active state and thus actually storing data.

3. A method as set forth in claim 2 wherein said step of identifying comprises the step of analyzing the data contained in each tuple on each page of each said relation that does not have a data page structure that includes a status bit map.

4. A computer implemented method for performing relational data base memory utilization analysis for a data base having allocated memory such that memory actually utilized is determined, comprising the computer implemented steps of:

(a) selecting a set of data base files to be analyzed;

(b) specifying a set of relations, said set of relations being a selected subset of all of the relations located within said set of data base files, for which memory utilization information is to be determined, each said relation including a plurality of tuples for storing data and each said tuple having a size and a data activity state from the group of states including active and inactive;

(c) determining which of said relations in said set of relations has a data page structure having a plurality of data pages, each said data page including a status bit map indicating said data activity state of each tuple;

(d) detecting the contents of said status bit map on each page of each relation having said data page structure that includes said status bit map and identifying tuples in said active state and thus actually storing data;

(e) analyzing the data contained in each tuple on each page of each relation that does not have a data page structure that includes a status bit map and identifying tuples in said active state and thus actually storing data; and (f) determining the memory actually utilized for each said relation based upon said identified tuples and the size of said identified tuples such that the memory actually utilized in said specified set of relations within said selected set of data base files is determined.

5. A method as set forth in claim 4 wherein said step of analyzing the data contained in each tuple on each page further comprises the steps of:

(b) determining the number of tuples on each data page for each relation that does not have a data page structure that includes a status bit map;

(b) utilizing the tuple size and the determined number of tuples on a given data page to locate each tuple on said given data page; and

24 c) analyzing the content of each tuple on said given data page.

6. A method as set forth in claim 5 wherein said tuples are sequentially ordered on said data page and said step of analyzing the data contained in each tuple on each page further comprises the steps of:

(a) locating the first tuple on a given datapage; and (b) utilizing the tuple size and the determined number of tuples located on a given data page to sequentially analyze the contents of each tuple on said given data beginning with the first tuple located thereon.

7. A method as set forth in claim 5 wherein said step of analyzing the data contained in each tuple on each page further comprises the step of determining if a preselected bit pattern, indicating that a given tuple is unused, is present in the tuplex being examined on said given data page.

8. A method as set forth in claim 4 further comprising the steps of:

(a) transforming said activity state of each tuple for each relation in said set of relations and for each file in said set of data base files, into a set of signals indicating memory population; and (b) outputting said set of signals indicating memory population to thereby provide an analysis of data base memory utilization.

9. A method as set forth in claim 8 wherein said relational data base memory includes a set of Office Dependent Data (ODD) files created by a telephone switching system.

10. A method as set forth in claim 9 wherein each relation in each of said ODD files is represented by an entry in an access dictionary having access information that it utilized to access data pages of each relation in said set of relations in order to determine said data activity state of each tuple on each data page of each relation.

11. A computer implemented method for identifying the actual population of data within computer system memory utilized to support a set of relational data bases, comprising the computer implemented steps of:

(a) creating a list of files, wherein the set of files on said list constitute a preselected subset of said set of data bases and further wherein each file on said list contains a preselected set of relations, said preselected set of relations being a subset of all relations in said preselected subset of said set of data bases, to be analyzed, each relation including tuples for storing data, each tuple having a size and a data activity state from the group of states including active and inactive wherein said activity state indicates whether the tuple is populated with data;

(b) creating a list of said preselected set of relations from each of said files of said list of files;

(c) loading said list of files and said list of said preselected set of relations into a digital computer that is offline with respect to said computer system;

(d) determining in said digital computer said activity state of each tuple in each relation on said list of relations, said digital computer having access to said set of files; and (e) compiling information based upon said activity state of each tuple and its size to provide an indication of actual memory usage.

12. A method as set forth in claim 11 wherein the step of determining further comprises the steps of:

(a) determining which of the relations in said preselected set of relations has a data page structure that includes a status bit map for keeping track of tuples in a given relation in the active state and tuples in the given relation in the inactive state;

(b) identifying the number of tuples in said active state for each relation in said set of relations that has a data page structure that includes a status bit map by examining the contents of the status bit map on each page of each such relation; and (c) identifying the number of tuples in said active state for each relation in said set of relations that does not have a data page structure that includes a status bit map by analyzing the contents of each tuple on each data page in each such relation.

13. A method as set forth in claim 12 wherein said set of relational data bases includes Office Dependent Data (ODD) files created by a telephone switching system that includes an administrative module, a communications module and a set of switch modules in which binary data files, corresponding to said ODD files, are maintained and updated in real time.

14. A method as set forth in claim 13 wherein each relation in each of said ODD files is represented by an entry in an access dictionary that is utilized to access the data pages of each relation in said set of relations in order to determine said data activity status of each tuple on each data page each relation.

15. A method as set forth in claim 14 wherein said step of compiling further comprises the step of tabulating information on said activity sate of each tuple and storing said tabulated information in a statistical file, said file reflecting, for each relation analyzed, a total number of tuples in a given relation compared with the number of tuples in said active state.

16. A method as set forth in claim 14 wherein each said data page contains a maximum number of tuples and said step of compiling further comprises the step of
tabulating the number of tuples in said active state for each data page of each relation,
computing, based upon said number of tuplex in an active state and said maximum number of tuplex per data page a percentage fill for each data page of each relation, and
storing said computed percentage fill and said number of tuples in said active state in a verbose file.

17. A method as set forth in claim 14 wherein said step of compiling further comprises the step of tabulating said information regarding said activity state of each tuple, identifying relations having data pages which contain no data, and storing information related to said identified relations in an empty file to provide information regarding all data pages within a given switch module that contain no data.

18. A method as set forth in claim 14 wherein each data page of each relation has an identification number and wherein said step of compiling further comprises the steps of
comparing said identification number of each said data page of each said relation to an offset which indicates a range of files to be analyzed and,
if said offset is greater than said identification number, storing said identification number in a range check file to provide an error indication whenever the page identifier for a given page is outside the range of the switch module within which the page is properly located.

19. A computer implemented method for performing memory population analysis on a relational data base, wherein the contents of said data base include a first set of relations, each relation including tuples for storing data, each said tuple having a size and a data activity sate from the ground of sates including active and inactive and each relation having an associated status bit map for indicating the data activity state of each tuple within a given relation, and a second set of relations each created utilizing a storage and access method that does not maintain an associated bit map, comprising the computer implemented steps of:

(a) inputting, to a digital computer having access to the contents of said data base, a first set of signals specifying the relations to be analyzed, said relations to be analyzed being a selected subset of all relations in said data base, (b) inputting, to said digital computer, a second set of signals specifying the storage and access method associated with each relation of said relations to be analyzed;

(c) determining, from said second set of signals, whether a given relation being analyzed has an associated status bit map;

(d) accessing the status bit map for each relation being analyzed and belonging to said first set of relations;

(e) identifying tuples in the inactive data activity state in each relation being analyzed and belonging to said first set of relations, directly from the status bit map associated with each such relation; and (f) compiling information based on said identified tuples in the inactive data activity sate and the size of each said identified tuple.

20. A method as set forth in claim 19 further comprising the step of, whenever said second set of relations in non-empty, counting tuples within each such relation by analyzing the contents of each tuple to determine the data activity state of each tuple in each such relation.

21. A computer implemented method for analyzing a set of relational data bases that are stored in the memory of a set of switch modules includes in a telephone switching system, wherein said set of relational data bases comprise static protected Office Dependent (ODD) that is classified as non-redundant if required for call processing based on special features and service required by the specific lines and trunks which are assigned to a particular switch module, and redundant if stored in the memory of every switch module without regard to the nature of the lines and trunks connected, comprising the computer implemented steps of:

(a) entering a list of ODD files to be analyzed into a digital computer;

(b) initializing a hard coded table, stored within said computer, to include a list of relations containing redundant data within said ODD files;

(c) initializing a hard coded table, stored within said computer, to include a list of relations containing non-redundant data within said ODD files;

(d) inputting to said digital computer, from media containing the ODD files in binary form, an ODD file to be analyzed;

(e) initializing the ODD file input to said digital computer;

(f) reading an access dictionary to determine head table, intermediate table and data page location information for each relation listed in the redundant and non-redundant hard coded tables, said relations listed in the redundant and non-redundant hard coded tables being a subset of all relations in said ODD files, each said relation including tuples for storing data, each said tuple having a size and a data activity state from the group of states including active and inactive wherein if said tuple is in an active state, then the tuple is populated and stores data;

(g) processing each relation listed in the redundant and non-redundant hard coded tables for the ODD file input in step (d) to determine said data activity sate of each tuple in each listed relation;

(h) outputting memory population information for each processed relation based on the activity state and size of each tuple; and (i) if further ODD files on said list of ODD files remain to be processed, returning to step (d) and specifying the next ODD file on said list of ODD files as the ODD file to be analyzed if any such files remain and terminating the relational data base analysis if not further ODD files remain to be processed.

22. A method as set forth in claim 21 wherein said memory population information output is provided in terms of pages, tuples and bytes.

23. A relational data base memory analyzer, for identifying the actual population of data within a computer system memory utilized to support a set of relational data bases, wherein said data base analyzer is provided with a list of files, an a list of preselected relations, said list of preselected relations being a subset of all relations in said files, within each file, to be analyzed, comprising:

(a) a digital computer which is associated with but offline with respect to said computer system;

(b) means for loading said list of files and said list of said preselected relations into said digital computer, each relation including tuples for storing data, each tuple having a size and a data activity state from the group of states including active and inactive wherein said activity state indicates whether the tuple is populated with data;

(c) program means for determining said data activity state of each tuple in each relation on said list of relations, said means having access to the binary version of the set of files on said list of files;

(d) means for compiling data activity state for each tuple and (e) means for outputting said compiled data activity states to the computer system to provide, based upon said compiled activity states and the size of each tuple, and indication of actual memory usage.

24. Apparatus for performing memory population analysis on a relation data base, wherein each relation of the relational data base includes tuples for storing data, each tuple having a size and a data activity state from the group of states including active and inactive, said activity state indicating whether the tuple is populated with data and wherein the contents of said data base include a first set of relations each having an associated status bit map for indicating the data activity state of each tuple in the relation within a given relation, and a second set of relations each created utilizing a storage and access method that does not maintain an associated bit map, comprising:

(a) a digital computer having access to the contents of said data base;

(b) means for inputting a first set of signals to said digital computer, wherein said first set of signals specify the relations to be analyzed, said relations to be analyzed being a selected subset of all relations in said data base, (c) means for inputting a second set of signals to said digital computer, wherein said second set of signal specify the storage and access method associated with each relation of said relations to be analyzed;

(d) tuple status determination means, located within said digital computer, for (1) determining, from said second set of signals, whether a given relation being analyzed has an associated status bit map; (2) accessing the status bit map for each relation being analyzed and belonging to said first set of relations; (3) identifying tuples in the inactive data activity sate known as unused tuples in each relation being analyzed and belonging to said first set of relations, directly from the status bit map associated with each such relation; and (4) compiling information based upon the identified tuples and the size of each identified tuple, said information being known as memory status information; and (e) means for outputting said memory status information from said digital computer.

25. Apparatus as set forth in claim 24 wherein said tuple status determination means is further operative to determine unused tuples within each relation in said second set of relations by analyzing the contents of each tuple located therein.

26. Apparatus as set forth in claim 25 wherein said tuple status determination means is a computer implementing computer program means.

27. Apparatus for analyzing a set of relational data bases that are stored in the memory of a set of switch modules included in a telephone switching system, wherein said set of relational data bases comprise static protected Office Dependent Data (ODD) that is classified as non-redundant if required for call processing based on special features and services required by the specific lines and trunks which are assigned to a particular switch module, and redundant if stored in the memory of every switch module without regard to the nature of the lines and trunks connected, comprising:

(a) a programmable digital computer;

(b) means for entering a list of ODD files to be analyzed into said digital computer;

(c) means for initializing a hard coded table, stored within said computer, to include a list of relations containing redundant data within said ODD files;

(d) means for initializing a hard coded table, stored within said computer, to include a list of relations containing non-redundant data within said ODD files;

(e) means for inputting to said digital computer, from media containing the ODD files in binary form, an ODD file to be analyzed;

(f) means for (1) initializing the ODD file input to said digital computer; (2) reading an access dictionary to determine ·head table, intermediate table and data page location information for each relation listed in the redundant and non-redundant hard coded tables, said relations listed in the redundant and non-redundant hard coded tables being a subset of all relations in said ODD files, each relation including tuples for storing data, each tuple having a size and a data activity state from the group of states including active and inactive wherein said activity state indicates whether the tuple is populated with data; (3) processing each relation listed in the redundant and non-redundant hard coded tables for the ODD file, by said means for inputting, to determine the data activity state of each tuple in each listed relation; (4) outputting information based upon tuples in the inactive data activity state and the size of each tuple in the inactive data state known as memory population information for each processed relation; and (5) determining if further ODD files on said list of ODD files remain to be processed, returning to step (d) and specifying the next ODD file on said list of ODD files as the ODD file to be analyzed if any such files remain and terminating the relational data base analysis if not further ODD files remain to be processed.

* * * * *